US012763570B2

(12) United States Patent
Aizawa et al.

(10) Patent No.: US 12,763,570 B2
(45) Date of Patent: Oct. 13, 2026

(54) IN-VEHICLE INTERRUPTING CURRENT SUPPLY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kiyoshi Aizawa, Yokkaichi (JP); Takahiro Kuratomi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 210 days.

(21) Appl. No.: 18/838,411

(22) PCT Filed: Feb. 28, 2022

(86) PCT No.: PCT/JP2022/008208
§ 371 (c)(1),
(2) Date: Aug. 14, 2024

(87) PCT Pub. No.: WO2023/162200
PCT Pub. Date: Aug. 31, 2023

(65) Prior Publication Data

US 2025/0158387 A1 May 15, 2025

(51) Int. Cl.
*H01H 37/76* (2006.01)
*H02H 7/08* (2006.01)

(52) U.S. Cl.
CPC .......... *H02H 7/0811* (2013.01); *H01H 37/76* (2013.01)

(58) Field of Classification Search
CPC ............................ H01H 37/76; H02H 7/0811
See application file for complete search history.

(56) References Cited

U.S. PATENT DOCUMENTS

| | | | | |
|---|---|---|---|---|
| 9,227,518 B2 * | 1/2016 | Fukushige | .............. | B60L 53/22 |
| 9,903,333 B2 * | 2/2018 | Terada | .................... | F02P 15/10 |

(Continued)

FOREIGN PATENT DOCUMENTS

| | | | |
|---|---|---|---|
| JP | S62-21322 | A | 1/1987 |
| JP | 2009240001 | A * | 10/2009 |
| WO | 03-032105 | A1 | 4/2003 |

OTHER PUBLICATIONS

International Search Report, Application No. PCT/JP2022/008208, mailed Apr. 26, 2022. ISA/Japan Patent Office.

*Primary Examiner* — Thai T Dinh
(74) *Attorney, Agent, or Firm* — Brooks Kushman P.C.

(57) ABSTRACT

An in-vehicle interrupting current supply device includes: a transformer that includes a first winding portion and a second winding portion; a driving unit; and a capacitor. The driving unit performs switching between a permission state in which current conduction to the first winding portion is permitted and a cancellation state in which the permission state is cancelled. The capacitor is electrically connected to an intermediate conductive path between the second winding portion and an interrupter, and can receive electric power from the second winding portion. In response to the driving unit repeating alternate switching between the permission state and the cancellation state, a charge current is supplied from the second winding portion side to the capacitor. The capacitor is discharged in response to a switch performing an ON operation, and a driving current flows into a current input portion.

10 Claims, 1 Drawing Sheet

(56) References Cited

U.S. PATENT DOCUMENTS

| | | | | |
|---|---|---|---|---|
| 10,833,499 | B2 * | 11/2020 | Kambham | H02H 1/0092 |
| 11,368,012 | B2 * | 6/2022 | Kambham | B60L 3/0046 |
| 2018/0147941 | A1 | 5/2018 | Kube | |
| 2019/0123542 | A1 | 4/2019 | Kambham | |

* cited by examiner

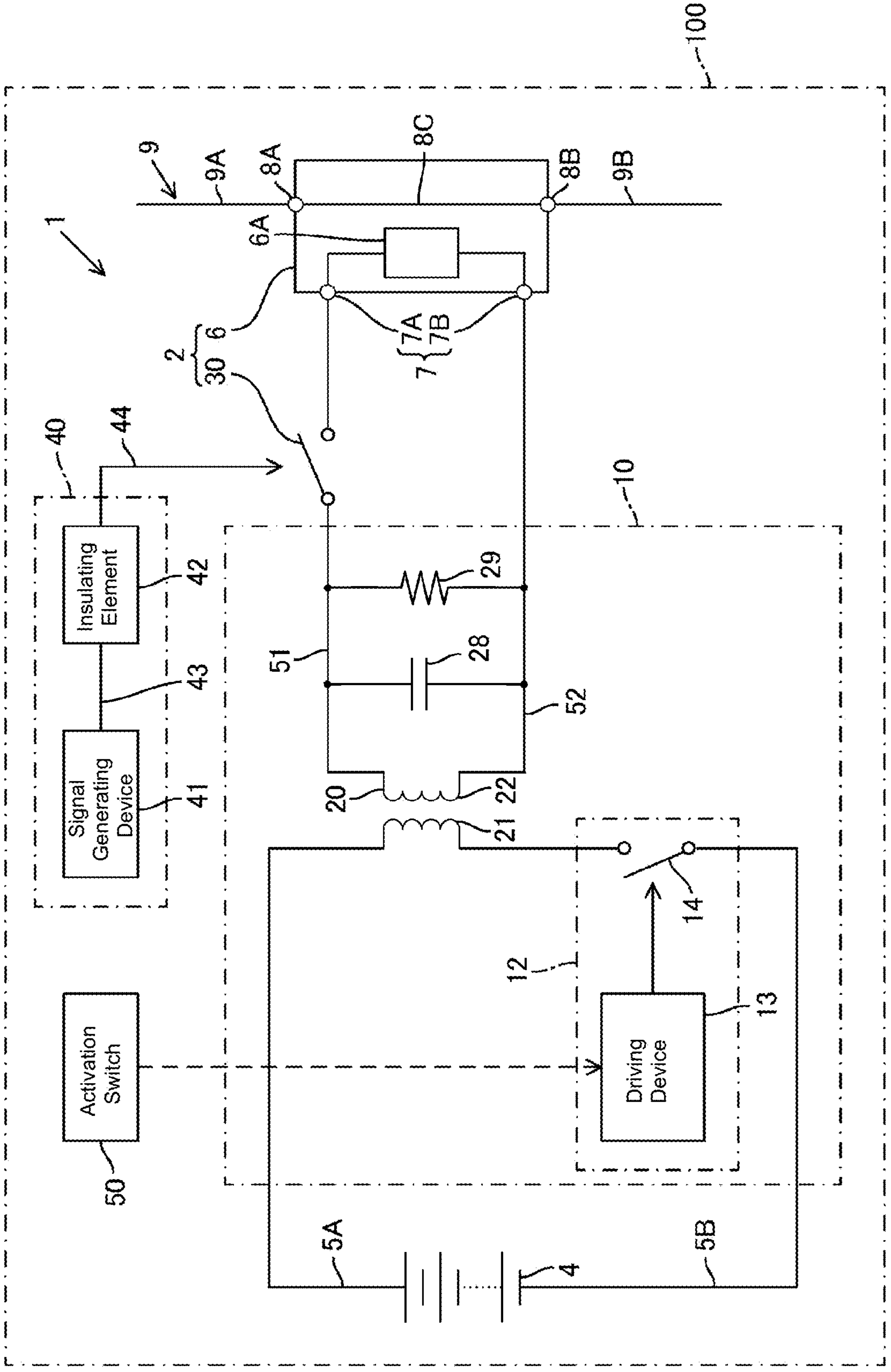
Insulating Element
Signal Generating Device
Activation Switch
Driving Device

IN-VEHICLE INTERRUPTING CURRENT SUPPLY DEVICE

CROSS-REFERENCE TO RELATED APPLICATIONS

This application is the U.S. national stage of PCT/JP2022/008208 filed on Feb. 28, 2022, the contents of which are incorporated herein.

TECHNICAL FIELD

The present disclosure relates to an in-vehicle interrupting current supply device.

BACKGROUND

JP S62-21322A discloses a driving circuit that includes a pulse transformer. The driving circuit disclosed in JP S62-21322A includes a power MOSFET that controls load electric power, a MOSFET that is provided in an upstream gate circuit in the power MOSFET, and a pulse transformer that inputs a PWM signal to the gate circuit.

There is an in-vehicle power supply system that includes an interrupter that can interrupt an electric power path. In this type of power supply system, when an interrupting condition is established, a signal generation circuit provides an interruption signal to the interrupter to cause the interrupter to perform an interrupting operation.

However, an interrupter provided in an electric power path may cause problems. For example, a surge voltage may be generated near the interrupter during interrupting operation, and a voltage caused by the surge voltage may enter the signal generation circuit side via a parasitic capacitance component, causing unexpected breakage of an element. To address this problem, a configuration as disclosed in JP S62-21322A or the like can be used in which the signal generation circuit side and the interrupter side are insulated from each other using a transformer or the like.

However, an interrupter that performs an interrupting operation upon receiving an input of a certain level of input current may require a large-sized component for insulating the signal generation circuit side and the interrupter side from each other.

It is an object of the present disclosure to provide a technique that facilitates a reduction in size of an in-vehicle interrupting current supply device that can drive an interrupter while increasing the insulation between the driving unit side and the interrupter side.

SUMMARY

An in-vehicle interrupting current supply device according to an aspect of the present disclosure is an in-vehicle interrupting current supply device that is applied to an in-vehicle interrupting device including an interrupter and a switch, the interrupter being provided in an electric power path and including a current input portion that is insulated from the electric power path, and the in-vehicle interrupting device operating to permit current conduction to the current input portion in response to the switch performing an ON operation and thereby cause the interrupter to perform an interrupting operation of interrupting the electric power path, the in-vehicle interrupting current supply device including: a transformer that includes a first winding portion and a second winding portion; a driving unit that performs switching between a permission state in which current conduction to the first winding portion is permitted and a cancellation state in which the permission state is cancelled; and a capacitor that is electrically connected to an intermediate conductive path between the second winding portion and the interrupter to receive electric power from the second winding portion, wherein a charge current is supplied from the second winding portion side to the capacitor in response to the driving unit repeating alternate switching between the permission state and the cancellation state, and in response to the switch performing the ON operation, the capacitor is discharged, and a driving current flows into the current input portion.

Advantageous Effects

A technique according to the present disclosure facilitates a reduction in size of an in-vehicle interrupting current supply device that can drive an interrupter while increasing the insulation between the driving unit side and the interrupter side.

BRIEF DESCRIPTION OF DRAWINGS

FIG. 1 is a block diagram schematically showing an example of an in-vehicle system that includes an in-vehicle interrupting current supply device according to a first embodiment.

DETAILED DESCRIPTION OF PREFERRED EMBODIMENTS

Hereinafter, aspects of an embodiment according to the present disclosure will be listed and described.

In a first aspect, an in-vehicle interrupting current supply device that is applied to an in-vehicle interrupting device including an interrupter and a switch, the interrupter being provided in an electric power path and including a current input portion that is insulated from the electric power path, and the in-vehicle interrupting device operating to permit current conduction to the current input portion in response to the switch performing an ON operation and thereby cause the interrupter to perform an interrupting operation of interrupting the electric power path, the in-vehicle interrupting current supply device including: a transformer that includes a first winding portion and a second winding portion; a driving unit that performs switching between a permission state in which current conduction to the first winding portion is permitted and a cancellation state in which the permission state is cancelled; and a capacitor that is electrically connected to an intermediate conductive path between the second winding portion and the interrupter to receive electric power from the second winding portion, wherein a charge current is supplied from the second winding portion side to the capacitor in response to the driving unit repeating alternate switching between the permission state and the cancellation state, and in response to the switch performing the ON operation, the capacitor is discharged, and a driving current flows into the current input portion.

With the in-vehicle interrupting current supply device according to the first aspect, due to the presence of the transformer, the insulation between the interrupter side and the driving unit side can be increased. Furthermore, the in-vehicle interrupting device not only inputs the electric current supplied directly from the second winding portion to the current input portion, but also inputs the discharge current from the capacitor to the current input portion. Accordingly, the in-vehicle interrupting device can achieve both a configuration in which the size of the transformer is suppressed and a configuration in which a certain level of electric current can be input to the current input portion, which facilitates a reduction in size of the in-vehicle interrupting current supply device that can drive the interrupter while increasing the insulation between the driving unit side and the interrupter side.

In a second aspect, the in-vehicle interrupting current supply device according to the first aspect, including: a discharge circuit that discharges the capacitor, wherein the capacitor is discharged by the discharge circuit, with current conduction from the capacitor to the current input portion being interrupted when the switch is OFF.

With the in-vehicle interrupting current supply device according to the second aspect, the driving operation performed by the driving unit is stopped when the switch is OFF, and the capacitor is discharged by the discharge circuit. By doing so, electric charges of the capacitor can be drained while interrupting current conduction to the interrupter.

In a third aspect, the in-vehicle interrupting current supply device according to the second aspect, wherein the current input portion includes a first terminal portion and a second terminal portion, the intermediate conductive path includes: a first conductive path that is provided between one end of the second winding portion and the first terminal portion; and a second conductive path that is provided between another end of the second winding portion and the second terminal portion, the capacitor includes an electrode that is electrically connected to the first conductive path and an another electrode that is electrically connected to the second conductive path, the discharge circuit includes a resistor that is connected in parallel to the capacitor between the first conductive path and the second conductive path, an electric current flows into the resistor, with the charge current being supplied from the second winding portion side to the capacitor, in response to the driving unit repeating alternate switching between the permission state and the cancellation state when the switch is OFF, and the electric current flows from the capacitor to the resistor in the case where the driving unit maintains the cancellation state when the switch is OFF.

With the in-vehicle interrupting current supply device according to the third aspect, the driving operation performed by the driving unit is stopped when the switch is OFF. By doing so, a configuration that allows electric charges of the capacitor to be drained can be more easily achieved. In addition thereto, when charging the capacitor while the switch is OFF, it is possible to cause the electric current to flow into the resistor concurrently with the charge of the capacitor, and thus the electric current can be more stabilized.

In a fourth aspect, the in-vehicle interrupting current supply device according to any one of the first through the third aspects, wherein a maximum value of the driving current supplied to the current input portion in response to the switch performing the ON operation is greater than a maximum value of the charge current supplied to the capacitor during charge of the capacitor.

With the in-vehicle interrupting current supply device according to the fourth aspect, the maximum value of the charge current supplied to the capacitor during charge of the capacitor is suppressed, and thus the size reduction of the transformer can be easily achieved.

In a fifth aspect, the in-vehicle interrupting current supply device according to any one of the first through the fourth aspects, wherein the driving unit starts a driving operation of alternately repeating the permission state and the cancellation state in response to an activation switch for activating a vehicle in which the in-vehicle interrupting device is mounted being switched from an OFF state to an ON state, and stops the driving operation when the activation switch is switched to the OFF state.

With the in-vehicle interrupting current supply device according to the fifth aspect, the in-vehicle interrupting current supply device can be prepared to start charging the capacitor and cause the interrupter to perform the interrupting operation when the vehicle is activated. On the other hand, when the vehicle stops, the in-vehicle interrupting current supply device can temporarily stop the charging of the capacitor.

In a sixth aspect, the in-vehicle interrupting current supply device according to any one of the first through the fifth aspects, wherein the interrupter is a pyrotechnic circuit interrupter that interrupts the electric power path when the driving current flows into the current input portion.

With the in-vehicle interrupting current supply device according to the sixth aspect, it is possible to cause the pyrotechnic circuit interrupter to perform the interrupting operation by supplying the driving current to the current input portion. In this type of pyrotechnic circuit interrupter, a surge voltage is likely to be generated near the pyrotechnic circuit interrupter due to the interrupting operation. However, in the in-vehicle interrupting current supply device, the surge voltage is unlikely to affect the driving unit side.

In a seventh aspect, the in-vehicle interrupting current supply device according to any one of the first through the sixth aspects, wherein when the switch is switched from an OFF state to an ON state while the driving unit is repeating alternate switching between the permission state and the cancellation state, an electric current is discharged from the capacitor to the current input portion, with the electric current being supplied from the second winding portion to the capacitor.

With the in-vehicle interrupting current supply device according to the seventh aspect, in a state in which the driving unit is repeating alternate switching between the permission state and the cancellation state, in addition to the discharge current from the capacitor, the electric current based on the second winding portion can also be used together.

In an eighth aspect, the in-vehicle interrupting current supply device according to any one of the first through the seventh aspects, wherein the interrupter includes an igniter into which the driving current supplied to the current input portion flows, the igniter performs an explosion operation when the driving current that corresponds to a required current value continuously flows over a required current conduction time, the interrupter operates to interrupt the electric power path in response to the igniter performing the explosion operation, and where a capacitance of the capacitor is indicated by C, an output voltage from the second winding portion is indicated by Vout, the required current conduction time is indicated by Tp, the required current value is indicated by Ip, a resistance value of the igniter is indicated by Rp, and a base of natural logarithm is indicated by e, the capacitance C of the capacitor is set to satisfy the following mathematical expression 1:

$$\frac{Vout}{Rp} \cdot e^{-\frac{1}{RpC}Tp} > Ip. \qquad \text{[Math. 1]}$$

With the in-vehicle interrupting current supply device according to the eighth aspect, it is likely to more reliably cause the igniter to cause an explosion when the switch performs an ON operation in a state in which the capacitor is sufficiently charged.

In a ninth aspect, the in-vehicle interrupting current supply device according to any one of the first through the eighth aspects, wherein the interrupter includes an igniter into which the driving current supplied to the current input portion flows, the interrupter operates to interrupt the electric power path in response to the igniter performing an explosion operation, and where a capacitance of the capacitor is indicated by C, an output voltage from the second winding portion is indicated by Vout, and an amount of power supply required to cause the igniter to perform the explosion operation is indicated by Ep, the capacitance C of the capacitor is set to satisfy the following mathematical expression 2:

$$\frac{1}{2}CV\text{ out}^2 > Ep. \quad \text{[Math. 2]}$$

With the in-vehicle interrupting current supply device according to the ninth aspect, it is likely to more reliably cause the igniter to cause an explosion when the switch performs an ON operation in a state in which the capacitor is sufficiently charged.

In a tenth aspect, the in-vehicle interrupting current supply device according to the seventh aspect, wherein the interrupter includes an igniter into which the driving current supplied to the current input portion flows, the igniter performs an explosion operation when the driving current that corresponds to a required current value continuously flows over a required current conduction time, the interrupter operates to interrupt the electric power path in response to the igniter performing the explosion operation, and where a capacitance of the capacitor is indicated by C, an output voltage from the second winding portion is indicated by Vout, the required current conduction time is indicated by Tp, the required current value is indicated by Ip, a resistance value of the igniter is indicated by Rp, and an amount of power supply required to cause the igniter to perform the explosion operation is indicated by Ep, the capacitance C of the capacitor is set to satisfy the following mathematical expression 3:

$$\frac{1}{2}CV\text{ out}^2 > Ep - RpIp^2Tp. \quad \text{[Math. 3]}$$

With the in-vehicle interrupting current supply device according to the tenth aspect, it is likely to more reliably cause the igniter to cause an explosion when the switch performs an ON operation in a state in which the capacitor is sufficiently charged.

First Embodiment

Overview of In-Vehicle System 1

FIG. 1 shows an in-vehicle system 1 that includes an in-vehicle interrupting current supply device 10 according to a first embodiment. In the description given below, the in-vehicle interrupting current supply device 10 is also referred to as "interrupting current supply device 10". The in-vehicle system 1 is a system that is mounted in a vehicle 100 and can supply electric power to various loads. The vehicle 100 in which the in-vehicle system 1 is mounted is a vehicle such as, for example, an electric vehicle, a plug-in hybrid car, or a hybrid car, and may be any other type of vehicle.

As shown in FIG. 1, the in-vehicle system 1 is a system that is mounted in the vehicle 100. In FIG. 1, the vehicle 100 is conceptually indicated by a dashed-dotted line frame. The in-vehicle system 1 includes a battery 4, an interrupting current supply device 10, an interruption signal generation unit 40, an interrupting device 2, an activation switch 50, and the like.

The activation switch 50 may be, for example, an ignition switch for activating an engine in the case where the vehicle 100 is a plug-in hybrid car or a hybrid car. The activation switch 50 may be a power switch for activating an EV system in the case where the vehicle 100 is an electric vehicle.

The battery 4 is an in-vehicle storage battery, and may be a secondary battery such as a lead acid battery or a lithium ion battery, or any other type of storage battery. The battery 4 applies a predetermined DC voltage (for example, 12 V) between conductive paths 5A and 5B when it is fully charged. In the description given below, the output voltage of the battery 4 is indicated by V1.

An electric power path 9 is a conductive path through which electric power is transmitted. The electric power path 9 can be used as, for example, a conductive path for supplying electric power to the loads mounted in the vehicle. However, the application of the electric power path 9 is not limited thereto. The electric power path 9 includes a first electric power path 9A that is connected to one side of an interrupter 6 and a second electric power path 9B that is connected to the other side of the interrupter 6. The first electric power path 9A and the second electric power path 9B are short-circuited to each other when the interrupter 6 is in a conducting state, and are insulated from each other when the interrupter 6 is in a non-conducting state. In FIG. 1, elements that are connected to the first electric power path 9A and the second electric power path 9B on the opposite side of the interrupter 6 are not shown. The electric power path 9 is, for example, a conductive path to which a voltage higher than the voltage applied between the conductive paths 5A and 5B is applied.

The interrupting device 2 is a device for interrupting the electric power path 9. The interrupting device 2 includes a switch 30 and the interrupter 6.

The switch 30 is composed of a semiconductor switch such as an FET (Field Effect Transistor), a mechanical relay, or the like. The switch 30 permits an electric current to flow from capacitor 28 side to first terminal portion 7A side when the switch 30 is ON, and interrupts the electric current flowing from the capacitor 28 side to the first terminal portion 7A side when the switch 30 is OFF. Specifically, the switch 30 is ON while the interruption signal generation unit 40 is outputting an interruption signal (ON signal), and is OFF while the interruption signal generation unit 40 is outputting an interruption end signal (off signal). The bidirectional current conduction via the switch 30 is interrupted when the switch 30 is OFF, and is permitted when the switch 30 is ON.

In the example shown in FIG. 1, the interrupter 6 is composed of a pyrotechnic circuit interrupter. As the pyrotechnic circuit interrupter, a known pyrotechnic fuse such as Pyro-Fuse (registered trademark) can be preferably used. The interrupter 6 includes a current input portion 7, conductor portions 8A, 8B, and 8C, an igniter 6A, and a displacement portion (not shown). The current input portion 7 includes a first terminal portion 7A and a second terminal portion 7B, and is a portion through which an electric current flowing from the first terminal portion 7A toward the second terminal portion 7B flows when the switch 30 is ON. The current input portion 7 is insulated from the electric power path 9. The conductor portion 8A is a terminal that is connected to the first electric power path 9A and short-circuited to the first electric power path 9A. The conductor portion 8B is a terminal that is connected to the second electric power path 9B and short-circuited to the second electric power path 9B. The conductor portion 8C is a conductor that is short-circuited between the conductor portion 8A and the conductor portion 8B.

The igniter 6A is a portion that functions to cause a small explosion when an electric current flows from the first terminal portion 7A toward the second terminal portion 7B to move the displacement portion by the explosion. The displacement portion is held at a predetermined position before an explosion is caused by the igniter 6A (in a state in which the conductor portions 8A, 8B, and 8C are short-circuited to each other), and, when an explosion is caused by the igniter 6A, functions to disconnect and interrupt the conductor portion 8C by being displaced toward the conductor portion 8C side by the explosion.

As described above, in the interrupting device 2, when the switch 30 is switched to an ON state to permit current conduction to the current input portion 7, and a driving current flows through the current input portion 7 (specifically, when the driving current flows into the second terminal portion 7B from the first terminal portion 7A via the igniter), the interrupter 6 operates to interrupt the electric power path 9.

The interruption signal generation unit 40 includes a signal generating device 41 and an insulating element 42. The signal generating device 41 is a device that can perform an operation of providing an interruption signal (ON signal) to the switch 30 via a conductive path 44 and an operation of providing an interruption end signal (off signal) to the switch 30 via the conductive path 44. The signal generating device 41 is connected to a conductive path 43, and can provide an interruption signal (ON signal) and an interruption end signal (off signal) to the conductive path 43. One of the interruption signal and the interruption end signal is a high-level signal, and the other one is a low-level signal. The insulating element 42 is an element that transmits a signal provided by the conductive path 43 to the conductive path 44 while insulating the conductive path 43 and the conductive path 44 from each other. The insulation method used in the insulating element 42 may be an optical insulation method, an inductive insulation method, or a capacitive insulation method. In any case, when an interruption signal (ON signal) is output from the signal generating device 41 to the conductive path 43, the interruption signal (ON signal) is provided to the switch 30 while the signal generating device 41 and the switch 30 are insulated from each other, and in response thereto, the switch 30 performs an ON operation.

The signal generating device 41 outputs the interruption end signal (off signal) when a predetermined condition for interrupting the electric power path 9 is established. For example, the signal generating device 41 operates to output the interruption end signal (off signal) in a normal state in which the value of electric current flowing through the electric power path 9 is less than or equal to a threshold value, and output the interruption signal (ON signal) in an overcurrent state in which the value of electric current flowing through the electric power path 9 exceeds the threshold value. The predetermined condition for interrupting the electric power path 9 is not limited to the example described above, and the signal generating device 41 may operate to output the interruption signal (ON signal) when the vehicle 100 crashes.

Configuration of Interrupting Current Supply Device 10

The interrupting current supply device 10 includes a driving unit 12, a transformer 20, a capacitor 28, and a resistor 29. The interrupting current supply device 10 is a portion that functions as a source of supply of driving current to the interrupter 6.

The driving unit 12 includes a driving device 13 and a switching element 14. The driving unit 12 has a function of switching between a permission state in which current conduction to a first winding portion 21 is permitted and a cancellation state in which the permission state is cancelled.

The driving device 13 includes a control device. The control device is an information processing device that has a computation function and an information processing function, and includes, for example, a CPU, a storage unit, and the like. The driving device 13 outputs an ON signal for causing the switching element 14 to perform an ON operation and an OFF signal for causing the switching element 14 to perform an OFF operation. One of the ON signal and the OFF signal is, for example, a high-level signal, and the other one is a low-level signal.

The switching element 14 is composed of, for example, a semiconductor switch element such as an FET (Field Effect Transistor). The switching element 14 performs an ON operation when an ON signal is provided from the driving device 13, and performs an OFF operation when an OFF signal is provided from the driving device 13. The switching element 14 may be a switching element (for example, a bipolar transistor or the like) other than the FET.

The transformer 20 is a transformer that includes a first winding portion 21 and a second winding portion 22. The first winding portion 21 and the second winding portion 22 are composed of coils. When the electric current in the first winding portion 21 varies, the transformer 20 causes the second winding portion 22 to generate a voltage that corresponds to the variation in the electric current in the first winding portion 21. The number of windings N1 of the first winding portion 21 may be greater or less than the number of windings N2 of the second winding portion 22. When the switching element 14 is ON, an input voltage Vin that is equivalent to the output voltage of the battery 4 is applied to both ends of the first winding portion 21. Where the voltage across the second winding portion 22 is indicated by output voltage Vout, $Vin/Vout=N1/N2$. That is, an output voltage represented by $Vout=Vin \times N2/N1$ is generated at the second winding portion 22 in response to the switching element 14 being switched from an OFF state to an ON state.

A first conductive path 51 is a conductive path that is provided between one end of the second winding portion 22 and the first terminal portion 7A. A second conductive path 52 is a conductive path that is provided between the other end of the second winding portion 22 and the second terminal portion 7B. The second conductive path 52 is a conductor portion that is short-circuited to the other end of the second winding portion 22, the other electrode of the capacitor 28, the other end of the resistor 29, and the second terminal portion 7B. A portion of the first conductive path 51 on the second winding portion 22 side relative to the switch 30 is short-circuited to one end of the second winding portion 22, one electrode of the capacitor 28, and one end of the resistor 29. A portion of the first conductive path 51 on the interrupter 6 side relative to the switch 30 is short-circuited to the first terminal portion 7A.

The capacitor 28 is an element that is electrically connected to the first conductive path 51 and the second conductive path 52 that are intermediate conductive paths between the second winding portion 22 and the interrupter 6, and receives electric power from the second winding portion 22. One electrode of the capacitor 28 is electrically connected to the first conductive path 51, and the other electrode is electrically connected to the second conductive path. When the switch 30 is ON, an electric current can flow from the capacitor 28 to the first terminal portion 7A via the first conductive path 51.

The resistor 29 corresponds to an example of a discharge circuit. The resistor 29 has a function of discharging the capacitor 28. The resistor 29 is connected in parallel to the capacitor 28 between the first conductive path 51 and the second conductive path 52.

Operation of Interrupting Current Supply Device 10

The interrupting current supply device 10 performs a charge operation of charging the capacitor 28. At a timing of the charge operation, the driving device 13 switches the switching element 14 between on and off by providing an ON/OFF signal that alternately repeats an ON signal and an OFF signal to the switching element 14. Specifically, the driving device 13 switches the switching element 14 between on and off by providing a PWM signal that includes a high-level signal as the ON signal and a low-level signal as the OFF signal to the switching element 14. In response to the switching element 14 being switched from an OFF state to an ON state, an input voltage Vin that corresponds to the output voltage of the battery 4 is applied to both ends of the first winding portion 21. In response to the switching element 14 being switched from an ON state to an OFF state, the application of the voltage from the battery 4 applied to both ends of the first winding portion 21 is cancelled. With the ON/OFF operation described above, switching is alternately performed between a state in which the output voltage V1 is applied to both ends of the first winding portion 21 and a state in which the application of the output voltage V1 to both ends of the first winding portion 21 is cancelled. In response to the ON/OFF operation, in the second winding portion 22, an output voltage of about V1×N2/N1 is generated at maximum. As described above, in response to the driving unit 12 repeating alternate switching between the permission state and the cancellation state (or in other words, in response to alternately switching the switching element 14 between an ON state and an OFF state), a charge current is supplied from the second winding portion 22 side to the capacitor 28, and in this state, a small amount of electric current can flow into the resistor 29.

The driving unit 12 may start the driving operation (the driving operation of alternately switching the switching element 14 between an ON state and an OFF state to repeat alternate switching between the permission state and the cancellation state) in response to the activation switch 50 that activates the vehicle 100 being switched from an OFF state to an ON state. When the activation switch 50 is ON, the driving unit 12 may continue the driving operation until the ON state is switched to an OFF state. The driving unit 12 may stop the driving operation when the activation switch 50 is switched from the ON state to an OFF state. In this example, when the activation switch 50 is switched from the ON state to an OFF state, and the OFF state is maintained, the driving unit 12 maintains the cancellation state, and thus as long as the switch 30 is OFF, the capacitor 28 is discharged by the resistor 29 (discharge circuit) while interrupting the current conduction from the capacitor 28 to the current input portion 7. On the other hand, when the activation switch 50 is switched from the OFF state to an ON state, and the ON state is maintained, because the driving unit 12 performs the driving operation, as long as the switch 30 is OFF, electric current flows into the resistor 29, with the charge current being supplied from the second winding portion 22 side to the capacitor 28.

On the other hand, when the switch 30 is switched from the OFF state to an ON state while the capacitor 28 is being charged, in response to the switch 30 performing an ON operation, the capacitor 28 is discharged, and a driving current flows into the current input portion 7. For example, when the switch 30 is switched from the OFF state to an ON state while the driving unit 12 is performing the driving operation (while switching is alternately repeated between the permission state and the cancellation state), in a state in which an electric current that corresponds to the driving operation is supplied from the second winding portion 22 to the first conductive path 51, the electric current is discharged from the capacitor 28 to the current input portion 7. As described above, when the driving current is supplied from the capacitor 28 to the current input portion 7, a small explosion is caused in the igniter 6A, and the interrupter 6 interrupts the electric power path 9.

Even when the switch 30 is switched from the OFF state to an ON state while the driving unit 12 maintains the cancellation state, the current is discharged from the capacitor 28 to the current input portion 7. In this case, a small explosion is caused in the igniter 6A, and the interrupter 6 interrupts the electric power path 9 as long as the capacitor 28 is sufficiently charged before discharge, and an electric current is sufficiently supplied to the current input portion 7.

In the present embodiment, it is desirable that a maximum value of the driving current supplied to the current input portion 7 in response to the switch 30 performing the ON operation is greater than a maximum value of the charge current supplied to the capacitor 28 during charge of the capacitor 28. The driving unit 12 provides the PWM signal to the switching element 14 while adjusting the duty to satisfy the relationship.

In the present embodiment, the igniter 6A operates to generate the explosion when the driving current that corresponds to "required current value" continuously flows over "required current conduction time", and the interrupter 6 operates to interrupt the electric power path 9 in response to the igniter 6A performing an explosion operation. In this example, it is desirable that, where the capacitance of the capacitor 28 is indicated by C, the output voltage from the second winding portion 22 is indicated by Vout, the required current conduction time is indicated by Tp, the required current value is indicated by Ip, the resistance value of the igniter 6A is indicated by Rp, and the base of natural logarithm is indicated by e, the capacitance C of the capacitor 28 is set to satisfy the following mathematical expression 1. As a result of the capacitance C of the capacitor 28 being set as described above, when the capacitor 28 is sufficiently charged, it is possible to cause an electric current that corresponds to the required current value to continuously flow over the required current conduction time.

$$\frac{V\,out}{Rp} \cdot e^{-\frac{1}{RpC}Tp} > Ip \qquad \text{[Math. 1]}$$

Furthermore, it is desirable that, where the amount of power supply required to cause an explosion in the igniter 6A (the amount of power supply required to be supplied to the igniter 6A) is indicated by Ep, the capacitance C of the capacitor 28 is set to satisfy the following mathematical expression 2. As a result of the capacitance C of the capacitor 28 being set as described above, when the capacitor 28 is sufficiently charged, the driving current exceeding the amount of power supply required during discharge of the capacitor 28 can be supplied.

$$\frac{1}{2}CV\ \mathrm{out}^2 > Ep \qquad \text{[Math. 2]}$$

Furthermore, it is desirable that the capacitance C of the capacitor is set to satisfy the following mathematical expression 3. As a result of the capacitance C of the capacitor 28 being set as described above, when the capacitor 28 is sufficiently charged, the driving current exceeding the amount of power supply required during discharge of the capacitor 28 can be supplied.

$$\frac{1}{2}CV\ \mathrm{out}^2 > Ep - RpIp^2Tp \qquad \text{[Math. 3]}$$

Examples of Advantageous Effects

With the interrupting current supply device 10, due to the presence of the transformer 20, the insulation between the interrupter 6 side and the driving unit 12 side can be increased. Furthermore, the in-vehicle interrupting device 2 not only inputs the electric current supplied directly from the second winding portion 22 to the current input portion 7, but also inputs the discharge current from the capacitor 28 to the current input portion 7. Accordingly, the in-vehicle interrupting device 2 can achieve both a configuration in which the size of the transformer 20 is suppressed and a configuration in which a certain level of electric current can be input to the current input portion 7, which facilitates a reduction in size of the in-vehicle interrupting current supply device 10 that can drive the interrupter 6 while increasing the insulation between the driving unit 12 side and the interrupter 6 side.

The interrupting current supply device 10 can supply a charge current from the second winding portion 22 to the capacitor 28 via the first conductive path 51 during a driving operation in which the driving unit 12 repeats alternate switching between the permission state and the cancellation state. When the switch 30 is switched from an OFF state to an ON state, the interrupting current supply device 10 can cause an electric current to flow from the capacitor 28 to the first terminal portion 7A via the first conductive path 51, and cause the interrupter 6 to perform an interrupting operation.

In the interrupting current supply device 10, the maximum value of the charge current supplied to the capacitor 28 during charge of the capacitor 28 is suppressed, and thus the size reduction of the transformer 20 can be easily achieved.

The interrupting current supply device 10 can be prepared to start charging the capacitor 28 and cause the interrupter 6 to perform the interrupting operation when the vehicle 100 is activated. On the other hand, when the vehicle 100 stops, the interrupting current supply device 10 can temporarily stop the charging of the capacitor 28.

In a state in which the driving unit 12 is repeating alternate switching between the permission state and the cancellation state, in addition to the discharge current from the capacitor 28, the electric current based on the second winding portion 22 can also be used together.

With the interrupting current supply device 10, it is possible to cause the pyrotechnic circuit interrupter (the interrupter 6) to perform an interrupting operation by supplying the driving current to the current input portion 7. In this type of pyrotechnic circuit interrupter, a surge voltage is likely to be generated near the pyrotechnic circuit interrupter due to the interrupting operation. However, in the in-vehicle interrupting current supply device 10, the surge voltage is unlikely to affect the driving unit 12 side.

OTHER EMBODIMENTS

The present disclosure is not limited to the embodiment described in the foregoing description and drawings. For example, the features described in the embodiment given above and an embodiment given below may be combined as appropriate unless they are contradictory to each other. Also, any of the features described in the embodiment given above and an embodiment given below may be omitted unless it is clearly stated that the feature is essential. Furthermore, the embodiment given above may be changed as follows.

A switch may be provided between the resistor 29 and the intermediate conductive path, and current conduction between the intermediate conductive path and the resistor 29 is permitted when the switch is ON, and current conduction between the intermediate conductive path and the resistor 29 is interrupted when the switch is OFF.

The embodiments disclosed in the specification of the present application are exemplary in all aspects, and thus should not be construed as limiting. The scope of the present disclosure of the present application is not limited to the embodiments disclosed in the specification of the present application, and all changes that come within the scope of the claims of the present application or the meaning and range of equivalency of the claims are intended to be embraced within the scope of the disclosure of the present application.

The invention claimed is:

1. An in-vehicle interrupting current supply device that is applied to an in-vehicle interrupting device including an interrupter and a switch, the interrupter being provided in an electric power path and including a current input portion that is insulated from the electric power path, and the in-vehicle interrupting device operating to permit current conduction to the current input portion in response to the switch performing an ON operation and thereby cause the interrupter to perform an interrupting operation of interrupting the electric power path, the in-vehicle interrupting current supply device comprising:

a transformer that includes a first winding portion and a second winding portion;

a driving unit that performs switching between a permission state in which current conduction to the first winding portion is permitted and a cancellation state in which the permission state is cancelled; and a capacitor that is electrically connected to an intermediate conductive path between the second winding portion and the interrupter to receive electric power from the second winding portion, wherein a charge current is supplied from the second winding portion side to the capacitor in response to the driving unit repeating alternate switching between the permission state and the cancellation state, and in response to the switch performing the ON operation, the capacitor is discharged, and a driving current flows into the current input portion.

2. The in-vehicle interrupting current supply device according to claim 1, including;

a discharge circuit that discharges the capacitor, wherein the capacitor is discharged by the discharge circuit, with current conduction from the capacitor to the current input portion being interrupted when the switch is OFF.

3. The in-vehicle interrupting current supply device according to claim 2, wherein the current input portion includes a first terminal portion and a second terminal portion, the intermediate conductive path includes: a first conductive path that is provided between one end of the second winding portion and the first terminal portion; and a second conductive path that is provided between another end of the second winding portion and the second terminal portion, the capacitor includes an electrode that is electrically connected to the first conductive path and an another electrode that is electrically connected to the second conductive path, the discharge circuit includes a resistor that is connected in parallel to the capacitor between the first conductive path and the second conductive path, an electric current flows into the resistor, with the charge current being supplied from the second winding portion side to the capacitor, in response to the driving unit repeating alternate switching between the permission state and the cancellation state when the switch is OFF, and the electric current flows from the capacitor to the resistor in the case where the driving unit maintains the cancellation state when the switch is OFF.

4. The in-vehicle interrupting current supply device according to claim 1, wherein a maximum value of the driving current supplied to the current input portion in response to the switch performing the ON operation is greater than a maximum value of the charge current supplied to the capacitor during charge of the capacitor.

5. The in-vehicle interrupting current supply device according to claim 1, wherein the driving unit starts a driving operation of alternately repeating the permission state and the cancellation state in response to an activation switch for activating a vehicle in which the in-vehicle interrupting device is mounted being switched from an OFF state to an ON state, and stops the driving operation when the activation switch is switched to the OFF state.

6. The in-vehicle interrupting current supply device according to claim 1, wherein the interrupter is a pyrotechnic circuit interrupter that interrupts the electric power path when the driving current flows into the current input portion.

7. The in-vehicle interrupting current supply device according to claim 1, wherein when the switch is switched from an OFF state to an ON state while the driving unit is repeating alternate switching between the permission state and the cancellation state, an electric current is discharged from the capacitor to the current input portion, with the electric current being supplied from the second winding portion to the capacitor.

8. The in-vehicle interrupting current supply device according to claim 7, wherein the interrupter includes an igniter into which the driving current supplied to the current input portion flows, the igniter performs an explosion operation when the driving current that corresponds to a required current value continuously flows over a required current conduction time, the interrupter operates to interrupt the electric power path in response to the igniter performing the explosion operation, and where a capacitance of the capacitor is indicated by C, an output voltage from the second winding portion is indicated by Vout, the required current conduction time is indicated by Tp, the required current value is indicated by Ip, a resistance value of the igniter is indicated by Rp, and an amount of power supply required to cause the igniter to perform the explosion operation is indicated by Ep, the capacitance C of the capacitor is set to satisfy the following mathematical expression:

$$\frac{1}{2}CV\text{ out}^2 > Ep - RpIp^2Tp.$$

9. The in-vehicle interrupting current supply device according to claim 1, wherein the interrupter includes an igniter into which the driving current supplied to the current input portion flows, the igniter performs an explosion operation when the driving current that corresponds to a required current value continuously flows over a required current conduction time, the interrupter operates to interrupt the electric power path in response to the igniter performing the explosion operation, and where a capacitance of the capacitor is indicated by C, an output voltage from the second winding portion is indicated by Vout, the required current conduction time is indicated by Tp, the required current value is indicated by Ip, a resistance value of the igniter is indicated by Rp, and a base of natural logarithm is indicated by e, the capacitance C of the capacitor is set to satisfy the following mathematical expression:

$$\frac{\text{V out}}{Rp} \cdot e^{-\frac{1}{RpC}Tp} > Ip.$$

10. The in-vehicle interrupting current supply device according to claim 1, wherein the interrupter includes an igniter into which the driving current supplied to the current input portion flows, the interrupter operates to interrupt the electric power path in response to the igniter performing an explosion operation, and where a capacitance of the capacitor is indicated by C, an output voltage from the second winding portion is indicated by Vout, and an amount of power supply required to cause the igniter to perform the explosion operation is indicated by Ep, the capacitance C of the capacitor is set to satisfy the following mathematical expression:

$$\frac{1}{2}CV\text{ out}^2 > Ep.$$

* * * * *